United States Patent
Yue Gao et al.

(10) Patent No.: US 12,209,957 B2
(45) Date of Patent: Jan. 28, 2025

(54) MULTI-GAS SENSORS USING NON-DISPERSIVE INFRARED MATERIALS

(71) Applicant: Lumileds LLC, San Jose, CA (US)

(72) Inventors: Claire Yue Gao, Fremont, CA (US); Hisashi Masui, Newark, CA (US); Franklin Chiang, Campbell, CA (US)

(73) Assignee: Lumileds LLC, San Jose, CA (US)

( * ) Notice: Subject to any disclaimer, the term of this patent is extended or adjusted under 35 U.S.C. 154(b) by 221 days.

(21) Appl. No.: 17/990,787

(22) Filed: Nov. 21, 2022

(65) Prior Publication Data

US 2023/0168191 A1  Jun. 1, 2023

Related U.S. Application Data

(60) Provisional application No. 63/285,018, filed on Dec. 1, 2021.

(51) Int. Cl.
*G01N 21/3504* (2014.01)

(52) U.S. Cl.
CPC ... *G01N 21/3504* (2013.01); *G01N 2201/127* (2013.01)

(58) Field of Classification Search
CPC ......... G01N 21/3504; G01N 2201/127; G01N 2201/0627; G01N 21/3151; G01N 33/0036
See application file for complete search history.

(56) References Cited

U.S. PATENT DOCUMENTS

2021/0109014 A1\* 4/2021 Heffels ................. G01N 21/61

\* cited by examiner

*Primary Examiner* — Courtney D Thomas
(74) *Attorney, Agent, or Firm* — Schwegman, Lundberg & Woessner, P.A.

(57) ABSTRACT

A gas sensing system measures a concentration of first and second gasses in a gas sample disposed in a cavity containing a porous scattering material. The first and second gas each have an absorption peak at a different wavelength. First and second emitters emit light having a spectrum that includes one of the different wavelengths. A single sensor, or multiple sensors, detect at least some of the light emitted by the first and second emitters. A processor determines concentration of the first and second gases from signals from the sensor that indicate intensities of the light from the first and second emitters. When a single sensor is used, the first and second emitters are driven, and the sensor signal detected, at different times. When multiple sensors are used, the sensors detect signals at one of the absorption peaks.

20 Claims, 7 Drawing Sheets

MULTI-GAS SENSORS USING NON-DISPERSIVE INFRARED MATERIALS

PRIORITY CLAIM

This application claims the benefit of priority to U.S. Provisional Patent Application Ser. No. 63/285,018, filed Dec. 1, 2021, which is incorporated herein by reference in its entirety.

TECHNICAL FIELD

The present disclosure relates to detecting a concentration of a gas.

BACKGROUND

There is ongoing effort to improve detecting a concentration of a gas. In particular, gas detectors in many commercial applications may be bulky and difficult to install. Thus, it is desirable to reduce the size of gas chambers, and consequently, the gas detector, used to detect the gas.

Figure 1:
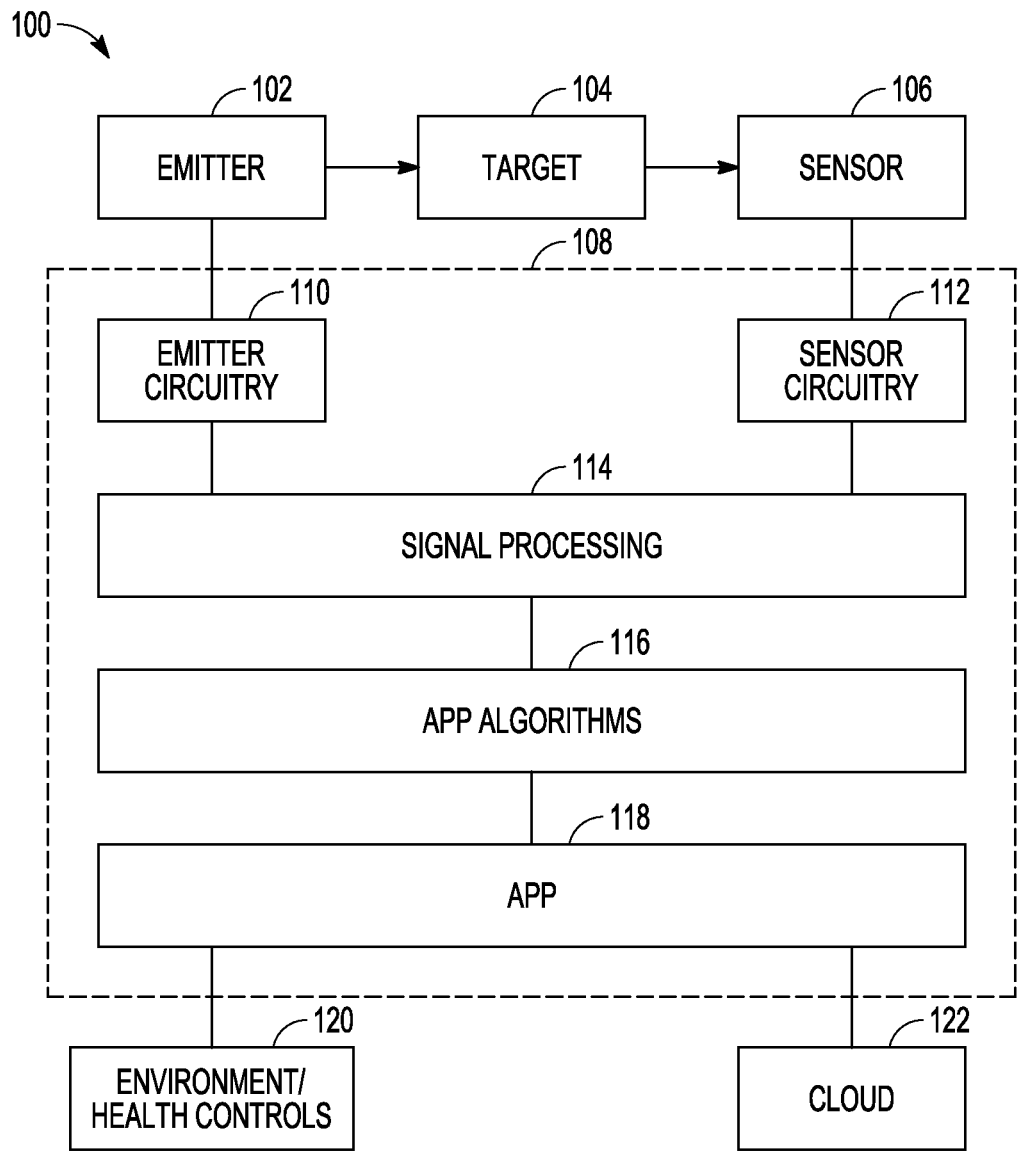
FIG. 1 shows a schematic drawing of an example of a gas sensing system, in accordance with some embodiments.

Corresponding reference characters generally indicate corresponding parts throughout the several views. Elements in the drawings are not necessarily drawn to scale. The configurations shown in the drawings are merely examples and should not be construed as limiting the scope of the disclosed subject matter in any manner.

DETAILED DESCRIPTION

Gas detection is becoming more common for a variety of applications. For example, detecting concentration levels of methane can help guide downstream decisions in the fields of industrial oil and gas exploration, safety, climate change, and others. Detecting concentration levels of formaldehyde and/or volatile organic compounds (VOCs) can help guide downstream decisions in the fields of air quality, safety, and others. Detecting concentration levels of carbon dioxide can help guide downstream decisions in the fields of smart buildings, air quality, capnography, climate change, and others. Detecting concentration levels of carbon monoxide and/or nitrogen dioxide can help guide downstream decisions in the fields of safety and others. Detecting concentration levels of ammonia, sulfur hexafluoride, and/or volatile organic compounds can help guide downstream decisions in the fields of refrigeration, electrical systems, and others. Detecting concentration levels of glucose can help guide downstream decisions in the fields of medicine and others.

Some gas detection systems can make use of a natural absorption of a gas material. For example, methane is found to be absorbent at a wavelength of about 3.3 microns. When a gas sample is illuminated with light at the wavelength of about 3.3 microns, methane in the gas sample can absorb some of the illumination (i.e., at least partially absorb the light). A sensor or detector in the gas detection system can measure the illumination remaining after the illumination passes through the gas sample.

One category of these illumination/detection gas detection systems can be based on the Beer-Lambert Law. In this category, the gas detection system illuminates the gas with light at or near the absorbent wavelength (or with light having a spectrum that includes the absorbent wavelength) and detects how much of the illuminating light passes through the gas sample. Based on the fraction of illuminating light that emerges from the gas sample, the gas detection system can calculate a concentration level of the particular gas in the gas sample. Such non-dispersive infrared (NDIR) gas sensing systems detects light specific to the targeted gas.

For gas detection systems based on the Beer-Lambert Law, the sensitivity and/or accuracy can scale with an optical path length over which the absorption can occur. As a result, gas detection systems with larger gas chambers tend to be more sensitive and/or more accurate than those with smaller gas chambers. For example, in a gas detection system in which the gas chamber is hollow, the illumination can progress in a straight line through the gas chamber, such that the optical path length can be comparable to a dimension of the gas chamber. Thus, example gas chamber dimensions may be 8 mm×33 mm×20 mm. However, it is desirable to shrink the size of gas detection systems to enable incorporation into more consumer goods, such as in a heating, ventilation, and air conditioning (HVAC) system, a smart speaker, in an automobile (such as in a fuel system, an in-cabin ventilation system, and/or an exhaust system), a refrigeration system, and others. However, shrinking the gas detection systems to fit into smaller spaces can compromise the sensitivity and/or accuracy of the system. As a result, the measurements in such systems may be exceedingly sensitive to noise, thereby demanding the use of additional electronic filters to improve the detection limit.

To improve the sensitivity and/or accuracy of the system, various embodiments of the gas detection systems described herein dispose a porous solid scattering material in the gas chamber and/or in a wall surrounding the gas chamber, so that in some cases, the gas being detected can permeate hollow spaces within the porous scattering material. The base scattering material can be transparent at about the illuminating wavelength (e.g., the wavelength at which the gas material is absorbent). Such scattering materials may include porous silicon, porous yttrium aluminum garnet (YAG), porous alumina, and porous titanium oxide ($TiO_2$), among others.

The scattering material can increase an optical path length of illuminating light that passes through the scattering material, compared with a single pass through a given volume (e.g., a linear dimension of the porous scattering material, or a path that would be taken if the space occupied by the porous scattering material were instead hollow). For example, in various embodiments of the gas detection system described herein, the scattering material can redirect the illumination multiple times within the scattering material. The actual optical path traversed by the illumination in the scattering material can be orders of magnitude larger than the actual size of the scattering material. As a result, the optical path length experienced by the illumination can be significantly greater than a dimension of the gas chamber, such by a factor of 10, 100, or more.

As a result of locating the porous scattering material inside the gas chamber and/or in a wall of the gas chamber, the gas chamber size can be decreased significantly, in order to maintain a sensitivity/accuracy comparable to what would be achieved by a system having a hollow gas chamber. Consequently, the gas detection systems described herein, which can dispose a porous scattering material in the gas chamber and/or in a wall of the gas chamber, can be significantly smaller than comparable systems that have a hollow gas chamber (optionally with impermeable walls), while achieving sensitivity/accuracy performance comparable to systems that have a hollow gas chamber (optionally with impermeable walls).

In some embodiments, a gas sensing system can allow a gas sample to permeate hollow spaces within a porous scattering material. As above, the base material in the porous scattering material can be substantially transparent at an illumination wavelength (e.g., greater than about 90%). An emitter can illuminate the porous scattering material and the gas sample with light having a spectrum that includes the illumination wavelength. A sensor can detect an intensity of the light from the emitter that has traversed the porous scattering material. Using an application of the Beer-Lambert Law, the system can determine a concentration of the target gas in the gas sample. The scattering can greatly increase an optical path length through the porous scattering material, compared with a linear dimension of the porous scattering material (e.g., a path that would be taken if the space occupied by the porous scattering material were instead hollow). The increased optical path length can allow a gas chamber to shrink in size, thereby decreasing a size of the gas sensing system without a corresponding decrease in a sensitivity and/or an accuracy of the system.

FIG. 1 shows a schematic drawing of an example of a gas sensing system 100, in accordance with some embodiments. As shown in the example of FIG. 1, an emitter 102 can emit light toward a target volume 104 (which is also referred to herein as a target 104). The target 104 can include a porous scattering material, such as disposed in a gas chamber and/or in one or more walls of a gas chamber, so that a gas sample can permeate hollow spaces within the porous scattering material, such as inside the gas chamber. A sensor 106 can detect light, emitted from the emitter 102, that has traversed through the target 104. At least one processor 108, coupled to the sensor 106, can determine a concentration of a specified gas material in the gas sample. Although only one processor is shown, in other embodiments, multiple processors may be used in the various embodiments herein.

The emitter 102 can be selected to emit light that can include a wavelength that is relatively strongly absorbed by the gas material that is to be detected. For example, methane has an absorption peak (e.g., a wavelength at which absorption is relatively large, compared to the absorption at adjacent wavelengths) at a wavelength of about 3.3 microns. To detect a concentration of methane in the gas sample, the emitter 102 can emit light at about 3.3 microns. Similarly, the emitter 102 can emit light at about 3.6 microns to detect formaldehyde and/or volatile organic compounds. The emitter 102 can emit light at about 4.3 microns to detect carbon dioxide. The emitter 102 can emit light at about 4.5 microns to detect carbon monoxide. The emitter 102 can emit light at about 4.7 microns to detect nitrogen dioxide. The emitter 102 can emit light at about 9 microns to detect ammonia, sulfur hexafluoride, and/or certain volatile organic compounds. The emitter 102 can emit light at about 10.4 microns to detect glucose. These numerical values are provided as examples only. Other suitable wavelengths can also be used to detect other gas materials or compounds.

The emitter 102 can emit light having a spectrum that is relatively sharply peaked compared to a broadband emitter like an incandescent lamp, which can be affected/absorbed by many substances. A sharp emitter is useful, even if methane and formaldehyde absorptions are close, in cases where it is known that only one of the two gases exists. The emitter 102 can emit light having a spectrum that is relatively broad. The emitter 102 can emit light having a spectrum that includes the wavelength at which absorption of the gas material or compound is relatively high. The emitter 102 can emit light in the infrared portion, the visible portion, and/or the ultraviolet portion of the electromagnetic spectrum. A filter (not shown) can be placed between the emitter 102 and the target 104 so as to provide light to the target 104 at a predetermined wavelength. The emitter 102 can emit light in the Middle Wavelength Infrared (MWIR) portion of the electromagnetic spectrum, with a wavelength range extending from about 3 microns to about 5 microns. The emitter 102 can emit light in the Long Wavelength Infrared (LWIR) portion of the electromagnetic spectrum, with a wavelength range extending from about 8 microns to about 14 microns.

In various embodiments, the emitter 102 can include one or more light-emitting diodes (LEDs). The one or more light-emitting diodes can include III-V semiconductor materials (or other semiconductor materials from, for example, II-VI columns). The one or more light-emitting diodes can include gallium antimonide (GaSb), indium phosphide (InP), indium arsenide (InAs), or other suitable materials. The emitter 102 can include one or more lasers. The emitter 102 can include one or more broadband sources that are spectrally filtered.

The target 104 can include a porous scattering material, such as porous alumina, porous silicon, porous YAG, porous $TiO_2$, and others. The porous scattering material can be disposed in a gas chamber and/or in a wall or walls of the gas chamber, so that a gas sample can permeate hollow spaces within the porous scattering material inside the gas chamber and/or in the wall or walls of the gas chamber. The porous scattering material can be transparent, or substantially transparent, at the wavelength of the light emitted by the emitter 102. The porous scattering material can be transparent, or substantially transparent, at the wavelength at which the gas sample is relatively absorbent. The target 104 and the porous scattering material can be sized and shaped in any suitable manner, as provided herein.

The sensor 106 can detect light, emitted from the emitter 102, that has traversed through the target 104. The sensor 106 can include one or more pixels (e.g., detector elements or sensor elements) or other types of sensors known in the art. In some embodiments, the sensor 106 can be separate from the emitter 102. The sensor 106 can include one or more sensor elements that are formed from a same or similar semiconductor material (e.g., III-V compound semiconductors) that is used in the emitter 102.

The sensor 106 can optionally be formed integrally with the emitter 102. For example, the sensor 106 and the emitter 102 can both be formed as light-emitting diodes in a single array or in a single integral package. The emitter 102 can be forward biased. The sensor 106 can include, for example, one or more reverse biased p-n junctions or a quantum well structure. Other configurations can also be used.

The processor 108, coupled to the sensor 106, can determine a concentration of a specified gas material in the gas sample based on scattered light collected by the sensor 106. The processor 108 can include emitter circuitry 110 that can drive the emitter 102. The processor 108 can include sensor circuitry 112 that can determine a power level of light that strikes the sensor 106. The sensor circuitry 112 can optionally include an analog-to-digital converter (ADC), among others. The processor 108 can include signal processing circuitry 114 that can analyze an output of the sensor circuitry 112. For example, the signal processing circuitry 114 can receive a value that represents a sensed optical power value, and can calculate, from the received value, a concentration level of the gas material in the gas sample. The signal processing circuitry 114 can employ the Beer-Lambert Law to perform the calculation, although other suitable calculations can be performed; for a three-dimensional chamber a dedicated calibration or calculation is used to deduce adequate concentration values to be output. The processor 108 can include one or more application algorithms 116 that can serve as an interface between the signal processing circuitry 114 and an application that includes a user interface. The processor 108 can include one or more applications 118 that can interface with the one or more application algorithms 116. The one or more application algorithms 116 can communicate with one or more servers dedicated to the environment and/or health controls 120. The one or more application algorithms 116 can communicate with one or more servers connected to the cloud 122.

The gas sensing system 100 can optionally detect two or more gas materials in a single gas sample. The two or more gas materials can have different wavelengths at which the respective gas materials are relatively absorbent. The emitter 102 can emit light at respective two or more wavelengths—e.g., either by emitting light having a set of wavelengths that is broad enough to be absorbed by the different gas materials or using different emitters that emit at the different wavelengths. The sensor 106 can sense light at the two or more wavelengths. To sense at the wavelengths, the gas sensing system 100 can include one or more wavelength-sensitive filters, such as to direct one wavelength onto one sensor element and direct another wavelength onto another sensor element, different sensors may be used that are able to detect at least one of the wavelengths emitted by emitter 102 and unable to detect at least one other of the wavelengths emitted by emitter 102.

In some examples, the emitter 102 can optionally emit reference light having a spectrum that includes a reference wavelength different from the detection wavelength. A single wideband emitter may be used, or separate emitters may be used that are tuned to each desired wavelength. The gas sample can interact with the light at the detection wavelength but may not interact with the reference light at the reference wavelength. The sensor 106 can optionally detect at least some of the reference light. The at least one processor 108 can use the level of the reference light at the sensor 106, in addition to the level of the detection light at the sensor 106, to determine the concentration of the gas material in the gas sample. In some examples, for which the gas sensing system 100 can sense two different gas materials, the emitter can emit a first wavelength and a second wavelength. The wavelengths can be selected such that a first gas interacts with the first wavelength but not the second wavelength and a second gas interacts with the second wavelength but not the first wavelength. Light at the second wavelength can serve as a reference for detecting the first gas, while light at the first wavelength can serve as a reference for detecting the second gas. Other combinations can also be used.

Figure 2A:
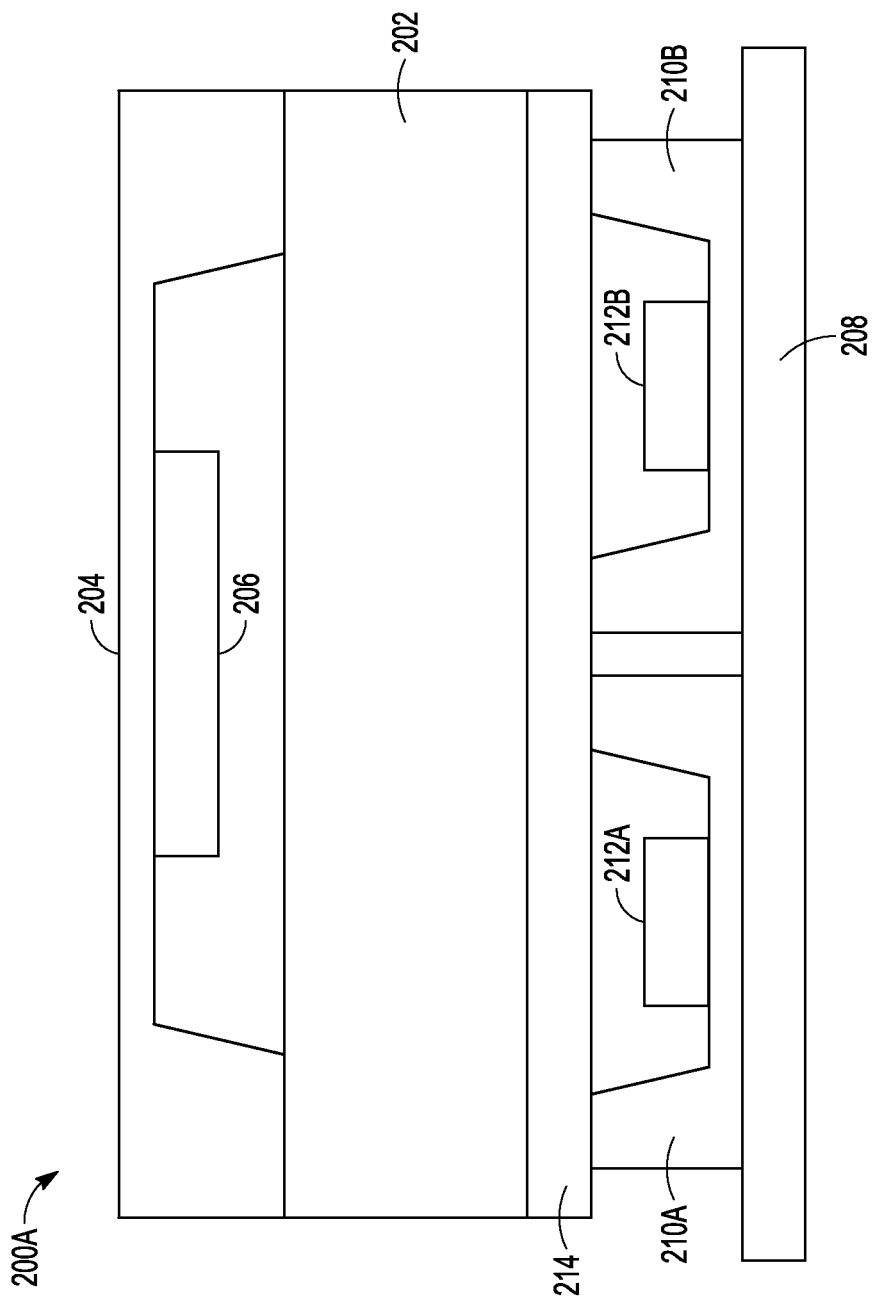
FIG. 2A shows a cross-sectional side view of an example of a gas sensing system, in accordance with some embodiments.

FIG. 2A shows a cross-sectional side view of an example of a gas sensing system 200a, in accordance with some embodiments. FIG. 2A omits the circuitry such as that in FIG. 1 to operate electronics in the gas sensing system 200a; any suitable circuitry can also be used as will be recognized by a person of ordinary skill in the art upon reading and understanding the disclosed subject matter.

The gas sensing system 200a (as well as the other embodiments herein) may permit detection of a single gas or of different gasses introduced therein. In particular, it may be desirable to combine the sensing of individual gasses into a single system. Thus, a desired gas sensing system may be able to detect different types of gasses instead of using multiple gas sensing systems that are each dedicated to sensing a different gas type. For a NDIR gas sensing system to detect multiple gasses simultaneously, light may be emitted in a wavelength specific to each of the targeted gasses. Thus, an NDIR gas sensing system may use multiple emitters that each emit light at a different wavelength that is specific to detection of the associated gas. For example, a gas sensing system contained in a single overall package may be used to detect the absolute concentrations of multiple gasses, e.g., $CO_2$, methane, and volatile organic compounds (VOCs). To enable this, the gasses introduced to the gas sensing system 200a may be selected to each have absorption that that is significantly less than (e.g., less than a few percent of) the absorption of the other gasses at the peak wavelength of each of the other gasses (i.e., the wavelength of the emitter for each of the other gasses).

The gas sensing system 200a of FIG. 2A contains a porous material 202, multiple emitters 212a, 212b, and a sensor 206 (also referred to herein as a detector). One or more of the multiple emitters 212a, 212b, and the sensor 206 may be the same as or similar to the emitter 102 and the sensor 106, respectively, of FIG. 1. FIG. 2A omits plumbing of the gas chamber, which can controllably pump a gas sample into a gas chamber in which the porous material 202 is disposed before a measurement has been taken and can controllably pump the gas sample out of the gas chamber after the measurement has been taken. The gas sensing system 200a can include an intake through which the gas sample is introduced into the gas chamber and an outlet through which the gas sample exits the gas chamber. The porous material 202 may be gas permeable to the gas sample.

The emitters 212a, 212b may be disposed in a respective LED package 210a, 210b that may be attached to a substrate 208. The substrate 208 may be a ceramic tile or printed circuit board (PCB), for example. The emitters 212a, 212b can be the same or similar to the emitter 102 of FIG. 1. The emitters 212a, 212b may emit light of the same or different wavelengths generally in a direction toward the porous material 202. In some embodiments, the emitters 212a, 212b may emit light of middle wavelength infrared (MWIR) wavelengths (about 3 μm to about 10 μm). In some embodiments, the light from the emitters 212a, 212b may be emitted in substantially all directions simultaneously and reflectors in the LED package 210a, 210b used to direct the light towards the porous material 202. The emitters 212a, 212b can be disposed in a lateral configuration in which the emitters 212a, 212b are located in a side-by-side arrangement, as shown in FIG. 2A (and applicable to FIGS. 2B-2C. As shown, the term "lateral" herein refers to the x direction shown in FIG. 2A (i.e., from one emitter to the other); the term "vertical" herein refers to the y direction shown in FIG. 2A (i.e., from the emitters to the detector).

In some embodiments, an optical bandpass filter 214 may be disposed on a surface of the porous material 202 or on the LED package 210a, 210b such that the optical bandpass filter 214 is between the emitters 212a, 212b and the porous material 202. The optical bandpass filter 214 may be formed from one or more layers that are transparent to the MWIR wavelengths emitted by the emitters 212a, 212b. For example, the optical bandpass filter 214 may form a Fabry-Perot cavity that allows light at a central wavelength and a narrow band of wavelengths to either side to be transmitted efficiently, while preventing light of other wavelengths from being transmitted using destructive interference. In this case, the optical bandpass filter 214 may include dielectric stacks alternating with dielectric spacer layers; each dielectric stack may itself contain alternating $\lambda/4$ layers of low-index material and high-index material, where $\lambda$ is the central wavelength, while the spacer layers have a thickness of $(n\lambda)/2$. In some embodiments, an MWIR window (with a flat surface) may be disposed on the surface of the optical bandpass filter 214 to oppose the emitters 212a, 212b. The optical bandpass filter 214 may have a bandpass selected dependent on the emitters 212a, 212b or the responsivity of the sensor 206. For example, the optical bandpass filter 214 may pass light having a wavelength between about 3 μm to about 10 μm and essentially absorb or reflect light of other wavelengths; i.e., the optical bandpass filter 214 may have a pass band with essentially a 100% transmittivity at a wavelength between about 3 μm to about 10 μm. The optical bandpass filter 214 may be formed from a single material or may have different materials with different pass bands that each oppose a different emitter 212a, 212b; each of the materials of the optical bandpass filter 214 is tailored for a specific one of the multiple emitters 212a, 212b opposing the material of the optical bandpass filter 214.

The porous material 202 may be used to scatter the light from the emitters 212a, 212b, whether or not the porous material 202 is permeable to the gas sample (non-permeable material likewise means that the gas molecules of the gas sample cannot penetrate the non-permeable material). The porous material 202 may include porous silicon, porous YAG, porous alumina, and porous $TiO_2$, among others, which are transparent at the wavelength at which the gas sample is absorbent. The light scattered by the porous material 202 can propagate through the porous material 202 and reach the sensor 206. In particular, the porous material 202 can be formed from a porous scattering material that contains particles that are transparent to MWIR wavelengths. The particles may be formed in any configuration, such as being close packed or random, and may have a continuous or discontinuous gradient along one or more axes. In some cases, rather than particles, the porous material 202 may contain hollow spaces (which may be gas permeable); that is, the gas sample may be able to permeate the hollow spaces. The light from the emitters 212a, 212b that enters the porous material 202 may scatter multiple times within the porous material 202, thereby increasing the path length of the light by a substantial amount and increasing the absorption of the light by the gas sample. The use of the porous material 202 that provides scattering of the light may be able to reduce the size of the cavity of the gas chamber, e.g., from about 3 cm to about 5 μcm along a characteristic dimensions (e.g., long axis) to less than about 1 cm while still providing similar or enhanced sensitivities to the gas(es) to be detected (e.g., being able to determine $CO_2$ concentrations between 400 ppm and 420 ppm).

In the configuration of FIG. 2A, the sensor 206 may be disposed in a detector package 204 and disposed vertically separated from the emitters 212a, 212b. That is, the sensor 206 and emitters 212a, 212b may be disposed on opposite sides of the porous material 202. The sensor 206 may be the same as or similar to the sensor 106 of FIG. 1. The sensor 206 may be able to detect the light from the emitters 212a, 212b. The light impinging on the sensor 206 has traversed one of a range of optical paths from the emitters 212a, 212b to the sensor 206. Although not shown in FIG. 2A (and in the other figures herein), another optical bandpass filter may be disposed between the porous material 202 and the sensor 206.

Figure 2B:
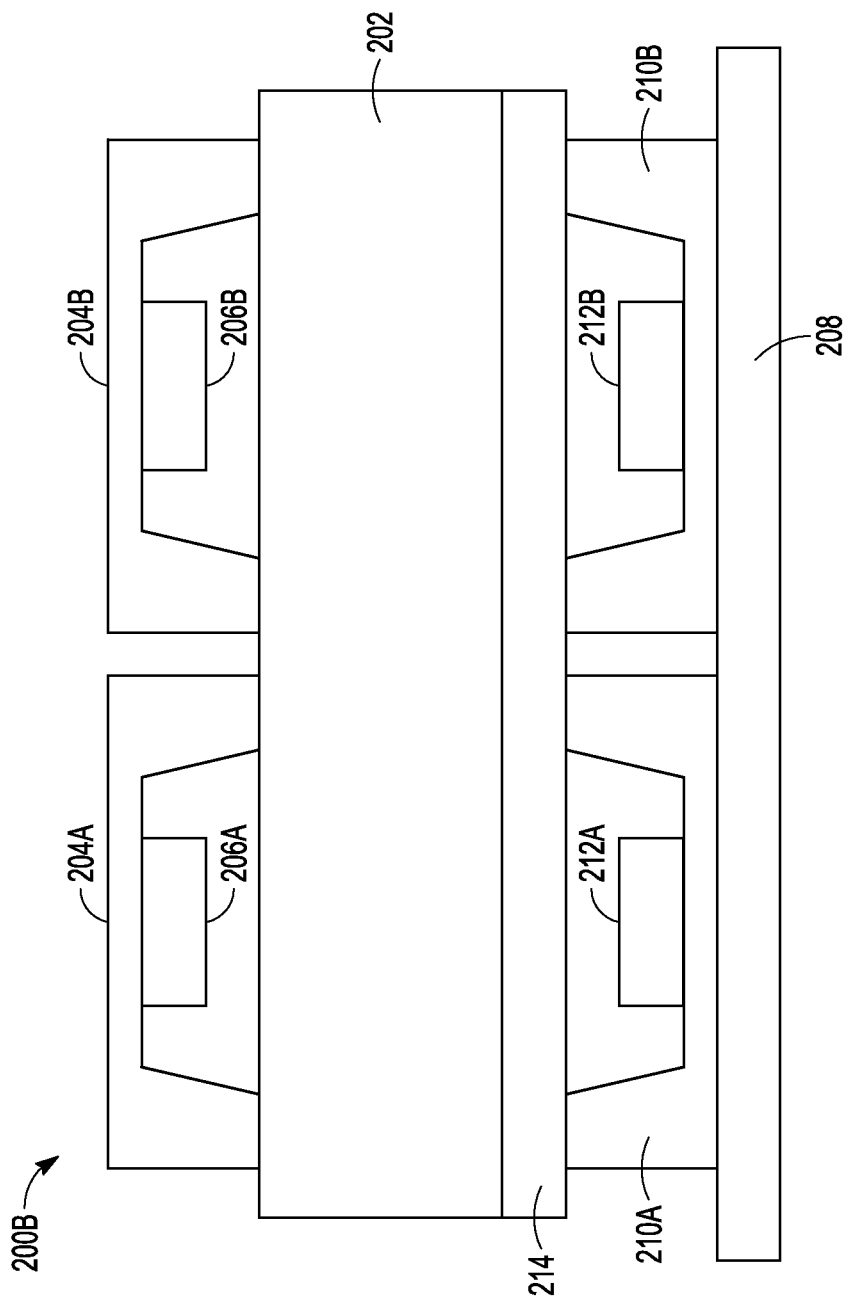
FIG. 2B shows a cross-sectional side view of an example of a gas sensing system, in accordance with some embodiments

FIG. 2B shows a cross-sectional side view of an example of a gas sensing system 200b, in accordance with some embodiments. The gas sensing system 200b is similar to gas sensing system 200a of FIG. 2A, except that multiple sensors 206a, 206b in respective detector packages 204a, 204b may be used rather than the single sensor 206 shown in FIG. 2A. The sensors 206a, 206b shown in FIG. 2B may be aligned with the emitters 212a, 212b such that the central optical axes of the sensors 206a, 206b and the emitters 212a, 212b are coincident. In other embodiments, the relative positions of the sensors 206a, 206b and the emitters 212a, 212b may be different.

Other elements, such as light guiding elements to guide light emitted by the emitters 212a, 212b to sensors 206a, 206b may be present but are not shown in FIG. 2A and FIG. 2B for convenience. The die sizes of the emitters 212a, 212b and sensors 206a, 206b may be the same or different (perhaps dependent on the wavelength being emitted/detected). Various combinations of small emitters, large emitters, small detectors, and large detectors may be used. The emitters 212a, 212b may be disposed in a single package or, as shown in FIG. 2A and FIG. 2B, each emitter 212a, 212b may be disposed in a separate LED package 210a, 210b. Similarly, the sensors 206a, 206b may be disposed in a single package or, as shown in FIG. 2B, each sensor 206a, 206b may be disposed in a separate detector package 204a, 204b.

The emitters 212a, 212b and sensors 206a, 206b may be disposed in other lateral or vertical configurations. The emitters 212a, 212b may be activated by signals modulated in the time or frequency domain (e.g., alternate on/off, or frequency modulation). In some configurations, a single die can be used to provide both the emitter and a receiver that detects light emitted by the emitter, with the emitter using a forward biased junction and the receiver using a reverse biased junction, and the emitter and receiver being disposed in a lateral configuration.

Figure 2C:
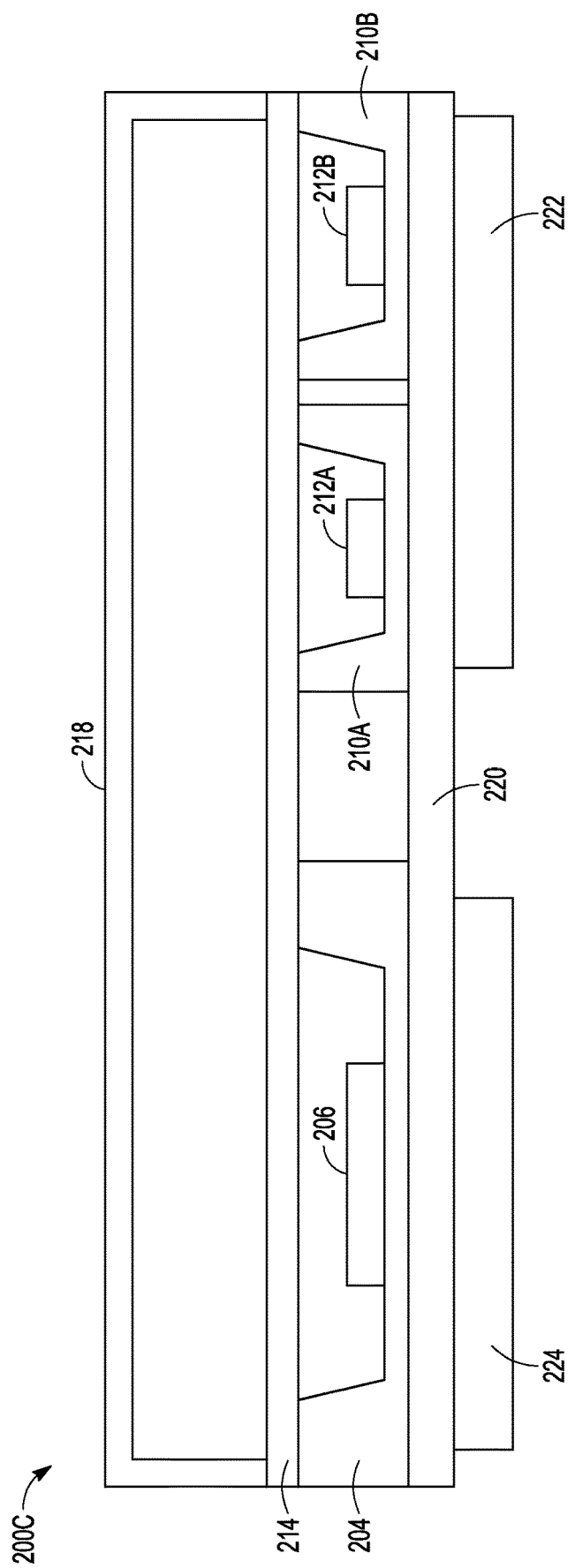
FIG. 2C shows a cross-sectional side view of an example of a gas sensing system, in accordance with some embodiments.

FIG. 2C shows a cross-sectional side view of an example of a gas sensing system 200c, in accordance with some embodiments. The gas sensing system 200c shown in FIG. 2C is similar to that of FIG. 2A, however, a gas chamber 218 may be present, and the emitters 212a, 212b and sensor 206 are disposed laterally rather than vertically. That is, the sensor 206 and emitters 212a, 212b may be disposed on the same side of the gas chamber 218. The optical bandpass filter 214 (and MWIR window) may be disposed between the emitters 212a, 212b and a hollow cavity of the gas chamber 218 as well as the sensor 206 and the hollow cavity of the gas chamber 218. The LED packages 210a, 210b containing the emitters 212a, 212b and the detector package 204 containing the sensor 206 may be attached to a PCB substrate 220. In other embodiments, a substrate such as the substrate 208 of FIG. 2A or 2B may be used as well. The emitters 212a, 212b may instead be an emitter/receiver package as described above. Emitter electronics (including driving circuitry) may be present in the emitter die 222 and used to control the emitters 212a, 212b. Similarly, sensor electronics (including driving circuitry) may be present in the sensor die 224 and used to control the sensor 206. The emitter die 222 and sensor die 224 may be disposed on the opposite side of the PCB substrate 220 as the LED packages 210a, 210b and detector package 204, as shown in FIG. 2C, or may be disposed on the same side of PCB substrate 220 as the LED packages 210a, 210b and detector package 204 in other embodiments.

The surfaces of the gas chamber 218 may provide diffusive reflective and/or specular reflective formed respectively by scattering or reflective material of the gas chamber 218 or a coating on the gas chamber 218. In some embodiments, the surfaces of the gas chamber 218 may all provide the same type of scattering (diffusive or specular), or at least one of the surfaces may provide a different type of scattering as at least one other of the faces. In some embodiments, the hollow cavity may contain the porous material 202 rather than being empty.

In some embodiments, the emitters 212a, 212b can serve as reference for each other, thereby providing absolute gas concentration measurements (as opposed to relative). That is, detector accuracy (i.e., concentration determinations) may drift in time, which may depend on use and environmental conditions in which the gas sensing system operates. In some embodiments, the gas sensing system 200a, 200b, 200c may be designed such that light from one of the emitters 212a may be weakly absorbed by a target gas to be detected using light of the other of the emitters 212b, and the ratio of absorption may be predetermined, the detection of the light from both of the emitters 212a, 212b (i.e., difference in emission intensity vs. detection intensity) for a particular gas may be combined to arrive at the absolute concentration of the particular gas. Thus, during a calibration mode, a gas sample having only one of the target gasses present may be measured (in some cases, the concentration may be known) using both of the emitters 212a, 212b. This may be repeated for multiple control gas samples each with only a different one of target gasses present. In other cases, time and/or frequency domain separation may be used to ensure detection of only one of the target gasses by both of the emitters 212a, 212b. A similar technique may be used to calibrate and zero sensor readings for the different emitter/detector combinations. Corresponding electronics, which are provided in FIGS. 3-5, may be used to distinguish the light from the emitters 212a, 212b.

Note that although the light emitters and light sensor(s) in the above figures are shown as being planar, in other embodiments one or both of the light emitters may be angled (at at least a few degrees from parallel) toward or away from each other and/or one or both of the light emitters and light sensor(s) may be angled (again, at at least a few degrees from parallel) toward or away from each other to improve the absorption by gas sample by increasing the path length.

Figure 3:
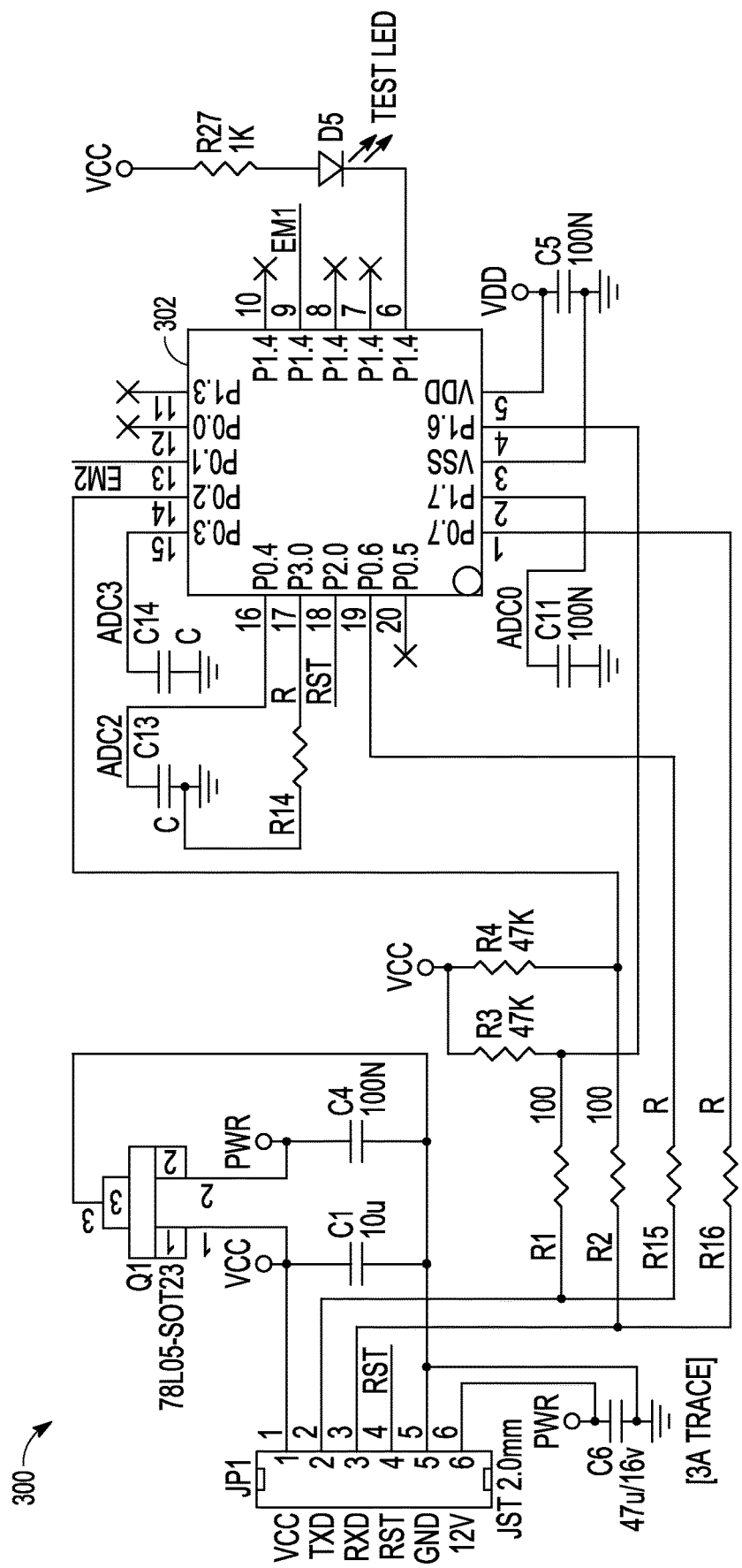
FIG. 3 shows an example of a controller circuit to control the emitters, in accordance with some embodiments.

FIG. 3 shows an example of a controller circuit 300 to control any one or more of the emitters discussed herein, in accordance with some embodiments. As shown, the controller circuit 300 may be disposed on the substrate 208, 220 shown in FIGS. 2A-2C and may contain a microcontroller 302 that provides a set of first control signals (EM1, EM2) a set of second control signals (ADC 0, ADC 2, ADC 3), and a reset signal (RST). A test LED may be coupled with one input of the microcontroller 302. Upon reading and understanding the disclosed subject matter, a person of ordinary skill in the art will recognize the various components of the controller circuit 300 and how they may be used with and applied to the disclosed subject matter.

Figure 4:
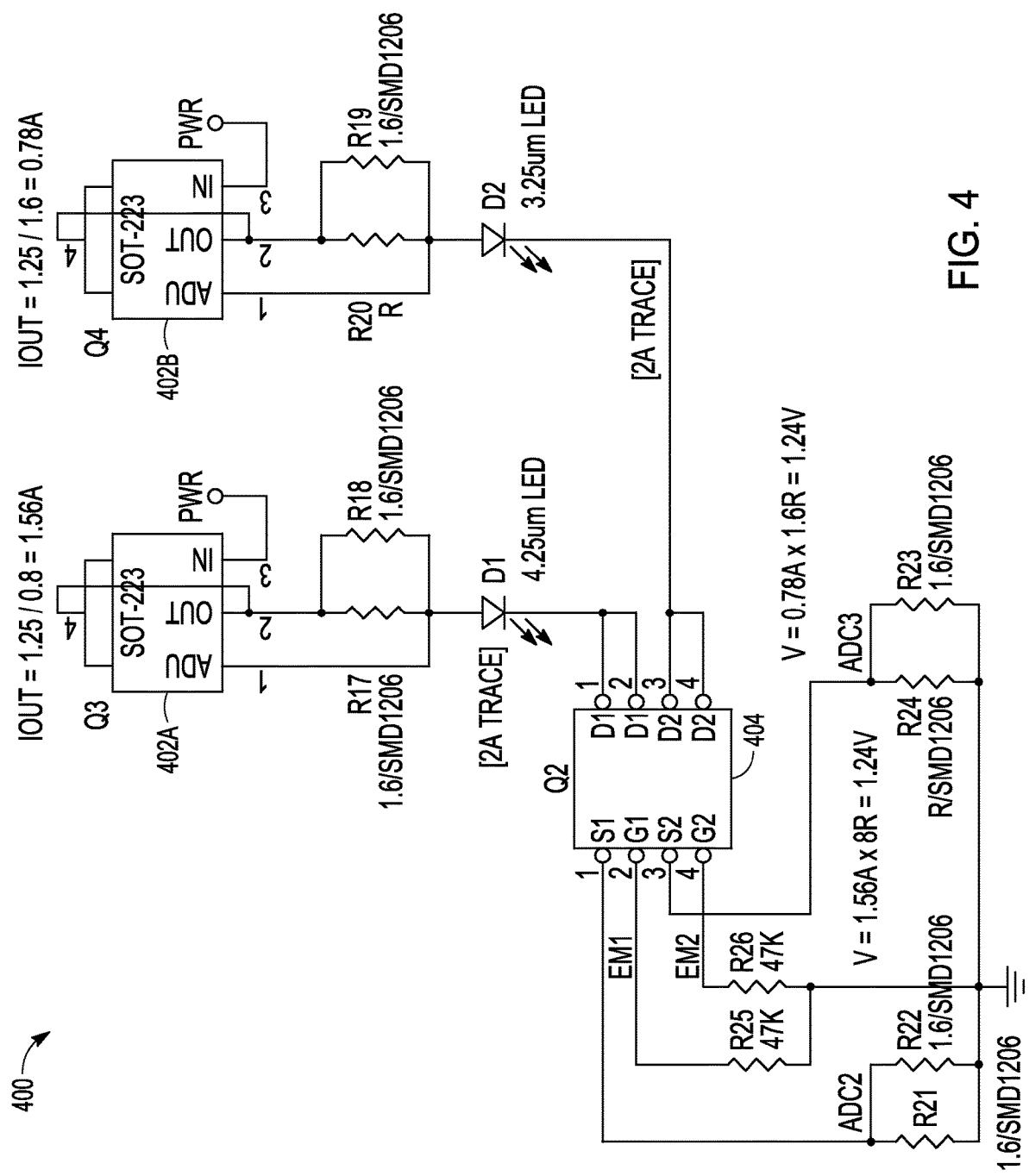
FIG. 4 shows an example of an emitter circuit to control the emitters, in accordance with some embodiments.

FIG. 4 shows an example of an emitter circuit 400 to control any of the one or more of the emitters discussed herein, in accordance with some embodiments. For each emitter (LED), an adjustable voltage regulator 402a, 402b may be respectively coupled to the emitter (D1/D2) through multiple impedance elements (shown as resistors (R17, R18/R19, R20)). As shown in FIG. 4, the adjustable voltage regulator 402a, 402b may be a three-terminal positive-voltage regulator that is capable of supplying more than about 1.5 A over an output-voltage range of about 1.25 V to 37 V. The output voltage may be set by two parallel resistors (R17, R18 and R19, R20) whose ends may be coupled to an output terminal and an adjustment terminal of the respective adjustable voltage regulator 402a, 402b. The output may be taken from the ends of the resistors (R17, R18/R19, R20) coupled to the adjustment terminal of the adjustable voltage regulator 402a, 402b and supplied to the emitter (D1/D2). The emitter (D1/D2) may be connected to switching circuitry 404, such as, for example, a power metal-oxide-semiconductor field effect transistor (MOSFET) to drive the emitter (D1/D2). The switching circuitry 404 may be isolated or, as shown, may be a chip. Some of the first set of the control signals (EM1, EM2) of the microcontroller 302 of FIG. 3 may be supplied to the gates of the switching circuitry 404 and some of the second set of the control signals (ADC 2, ADC 3) of the microcontroller 302 of FIG. 3 may be supplied to the sources of the switching circuitry 404, as shown in FIG. 4. In other embodiments, transconductance devices other than MOSFETs may be used, such as bipolar junction transistors. As shown in FIG. 4, the emitter circuit 400 may independently control each adjustable voltage regulator 402a, 402b to independently drive the emitters (D1, D2) using different control signals (EM1, EM2) of the microcontroller 302 of FIG. 3. This permits the emitters (D1, D2) to be activated independently to detect a single gas, multiple gasses, and/or calibrate the gas sensing system, as above.

Figure 5:
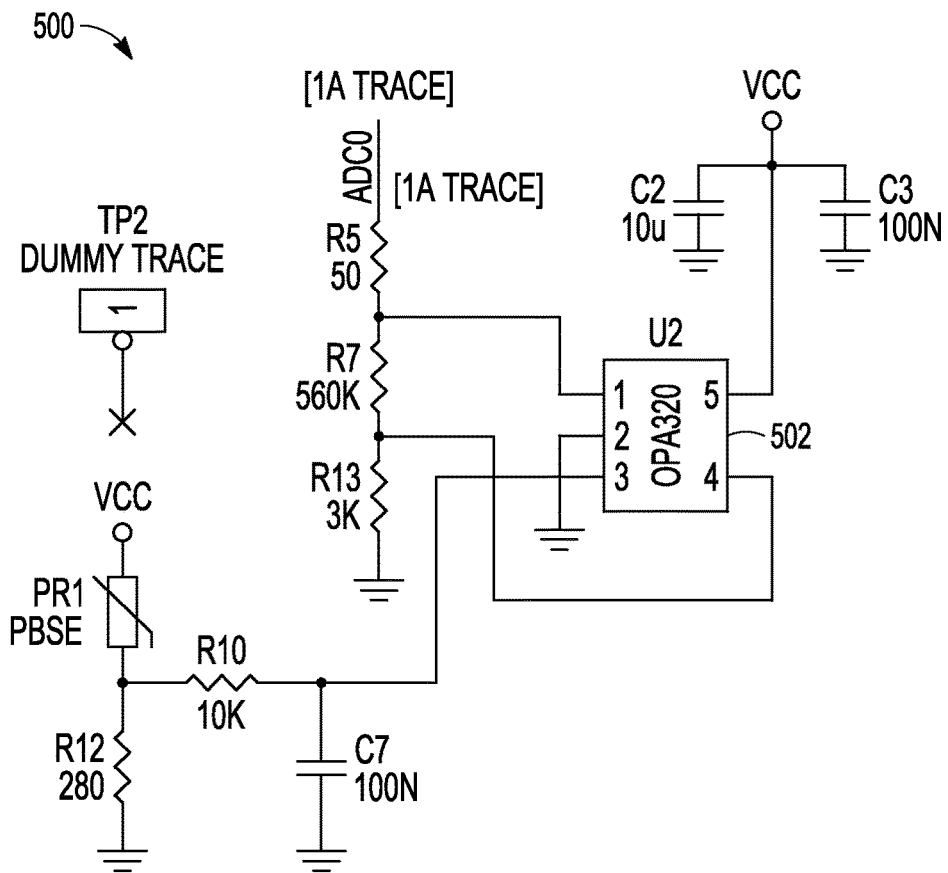
FIG. 5 shows an example of a receiver circuit for the sensors, in accordance with some embodiments.

FIG. 5 shows an example of a receiver circuit 500 for any one or more of the sensors discussed herein, in accordance with some embodiments. As shown, a control voltage of the second set of the control signals (ADC0) of the microcontroller 302 of FIG. 3 is supplied to a voltage divider formed from a set of resistors (R5, R7, R13). The output of one portion the voltage divider, between R5 and R7, is supplied to one input of an op-amp 502, and the output of the op-amp 502 is proved as feedback to another junction of the voltage divider (between R7 and R13). Another input of the op-amp 502 is coupled to the junction between a second voltage divider formed by the detector (PR1) and another resistor (R12) through a coupling resistor (R10). Note that although the receiver circuit 500 indicates only a single detector (PR1), corresponding to the arrangement shown in FIG. 2A, in other embodiments, multiple circuits and detectors can be used.

The circuits 300, 400, 500 shown in FIGS. 3-5 may enable modulation of signals in time and/or frequency for the emitter and/or receiver. Such circuits may support the use of multiple emitters and a single broadband detector (such as the configurations shown in FIGS. 2A and 2C) or multiple emitters and multiple detectors (such as the configuration shown in FIG. 2B).

Figure 6:
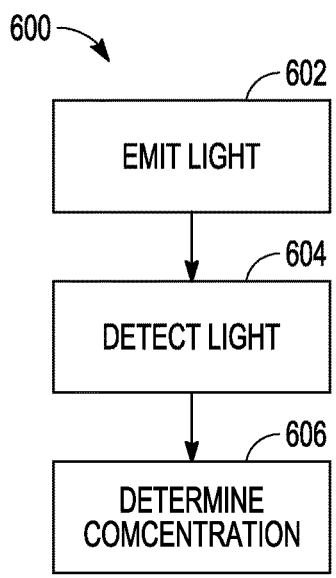
FIG. 6 shows a flow chart of an example of a method for measuring a concentration of multiple gasses in a gas sample, in accordance with some embodiments.

FIG. 6 shows a flow chart of an example of a method 600 for measuring a concentration of multiple gasses in a gas sample, in accordance with some embodiments. The gasses can have absorption peaks at different wavelengths. The method can be executed on any of the gas sensing systems discussed herein, or on other suitable gas sensing systems.

At operation 602, the method 600 can include emitting light having a spectrum that includes the different wavelengths. Multiple emitters may be tuned to different spectrum so that one or more of each of the emitters emits light at the wavelength at the peak (or near-peak) absorption of each of the gasses.

At operation 604, the method 600 can include detecting at least some of the light emitted by each of the emitters. The light may be detected by one or more sensors; in some embodiments a single wideband sensor that is sensitive to light of the different emitters may be used, while in other embodiments individual narrowband sensors may be used that have a peak (or near-peak) sensitivity at one of the different wavelengths absorbed by the gasses to be detected. The light may traverse a hollow cavity of the gas sensing system or may traverse a scattering structure within the hollow cavity. The emitters and detectors may be arranged in various configurations with the gas sensing system.

At operation 606, the method 600 can include determining a concentration of each of the gasses from an intensity of the light detected at the sensor(s). At least one processor, using the circuitry above, may be able to drive the emitters using time and/or frequency modulated driving signals, detect the signal from the sensor(s), and determine the concentrations based thereon by comparison of the received light to a table stored in memory of light intensity vs. concentration. The at least one processor may use the relative intensities from the different sensors to determine the absolute concentration of each of the gasses of interest in the gas sample, and, in calibration mode, calibrate the different emitters by introducing a known amount of the gas to be detected to the structure and determining the light intensity detected to create the table (repeating for different amounts of gas).

Note that various embodiment as described herein may include logic or a number of components, modules, or mechanisms such as those shown in FIG. 1, to calibrate and/or determine the gas concentrations and/or operate the emitter 102 and sensor 106. Modules and components are tangible entities (e.g., hardware) capable of performing specified operations and may be configured or arranged in a certain manner. In an example, circuits such as those shown in FIG. 1 may be arranged (e.g., internally or with respect to external entities such as other circuits) in a specified manner as a module. In an example, the whole or part of one or more hardware processors may be configured by firmware or software (e.g., instructions, an application portion, or an application) as a module that operates to perform specified operations. In an example, the software may reside on a machine readable medium. In an example, the software, when executed by the underlying hardware of the module, causes the hardware to perform the specified operations.

Accordingly, the term "module" (and "component") is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

The processor 108 may contain and/or be coupled with a memory that contains any or all of removable storage and non-removable storage, volatile memory or non-volatile memory. The overall system may further include a display unit such as a video display, an alphanumeric input device (e.g., a keyboard), and/or a user interface (UI) navigation device (e.g., a mouse), as well as an output communication a serial (e.g., universal serial bus (USB), parallel, or other wired or wireless (e.g., infrared (IR), near field communication (NFC), etc.) connection to communicate or control one or more peripheral devices (e.g., a printer, card reader, etc.). The memory may include a non-transitory machine readable medium (hereinafter simply referred to as machine readable medium) on which is stored one or more sets of data structures or instructions (e.g., software) embodying or utilized by any one or more of the techniques or functions described herein. The instructions may also reside, completely or at least partially, within the memory, during execution thereof by the processor 108. The term "machine readable medium" may include a single medium or multiple media (e.g., a centralized or distributed database, and/or associated caches and servers) configured to store the one or more instructions.

The term "machine readable medium" may include any medium that is capable of storing, encoding, or carrying instructions for execution by the processor 108 and that cause the processor 108 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); and CD-ROM and DVD-ROM disks. The instructions may further be transmitted or received over a communications network using a transmission medium.

Note that the term "circuitry" as used herein refers to, is part of, or includes hardware components such as an electronic circuit, a logic circuit, a processor (shared, dedicated, or group) and/or memory (shared, dedicated, or group), an Application Specific Integrated Circuit (ASIC), a field-programmable device (FPD) (e.g., a field-programmable gate array (FPGA), a programmable logic device (PLD), a complex PLD (CPLD), a high-capacity PLD (HCPLD), a structured ASIC, or a programmable SoC), digital signal processors (DSPs), etc., that are configured to provide the described functionality. In some embodiments, the circuitry may execute one or more software or firmware programs to provide at least some of the described functionality. The term "circuitry" may also refer to a combination of one or more hardware elements (or a combination of circuits used in an electrical or electronic system) with the program code used to carry out the functionality of that program code. In these embodiments, the combination of hardware elements and program code may be referred to as a particular type of circuitry.

The term "processor circuitry" or "processor" as used herein thus refers to, is part of, or includes circuitry capable of sequentially and automatically carrying out a sequence of arithmetic or logical operations, or recording, storing, and/or transferring digital data. The term "processor circuitry" or "processor" may refer to one or more application processors, one or more baseband processors, a physical central processing unit (CPU), a single- or multi-core processor, and/or any other device capable of executing or otherwise operating computer-executable instructions, such as program code, software modules, and/or functional processes.

EXAMPLES

Example 1 is a gas sensing system configured to measure a concentration of a first gas and a second gas in a gas sample introduced therein, each of the first gas and second gas having an absorption peak at a different wavelength, the gas sensing system comprising: a first emitter configured to emit first light having a spectrum that includes, a first wavelength of the different wavelengths of the first gas and second gas; a second emitter configured to emit second light having a spectrum that includes a second wavelength of the different wavelengths; a sensor configured to detect at least some of the first light and second light respectively emitted by the first emitter and second emitters; and a cavity into which the first light and second light are absorbed by at least one of the first gas and the second gas.

In Example 2, the subject matter of Example 1 includes, wherein the first emitter and second emitters are disposed on a same side of the cavity.

In Example 3, the subject matter of Example 2 includes, wherein the sensor is disposed on an opposite side of the cavity as the first emitter and second emitters.

In Example 4, the subject matter of Example 3 includes, wherein the sensor comprises: a first detector configured to detect the first light; and a second detector configured to detect the second light.

In Example 5, the subject matter of Examples 2-4 includes, wherein the sensor is disposed on the same side of the cavity as the first emitter and second emitters.

In Example 6, the subject matter of Examples 1-5 includes, wherein walls of the cavity provides one of specular or diffusive reflection.

In Example 7, the subject matter of Examples 1-6 includes, an optical bandpass filter disposed between the first emitter and second emitters and the cavity, the optical bandpass filter transparent to the first and second wavelengths.

In Example 8, the subject matter of Examples 1-7 includes, a porous scattering material disposed within the cavity, the porous scattering material that is substantially transparent to the first light and second light, the porous scattering material having regions that are configured to scatter at least some of the first light and second light.

In Example 9, the subject matter of Examples 1-8 includes, a printed circuit board (PCB) to which at least one emitter package containing the first emitter and the second emitter are attached; and circuitry configured to control the first emitter and second emitter and the sensor is disposed on the PCB.

In Example 10, the subject matter of Example 9 includes, wherein the circuitry is disposed on an opposite side of the PCB as the at least one emitter package.

In Example 11, the subject matter of Example 10 includes, wherein: the sensor is contained in at least one sensor package, the at least one sensor package is disposed on a same side of the cavity as the first emitter and second emitters, and the at least one sensor package is attached to the PCB on a same side of the PCB as the at least one emitter package.

In Example 12, the subject matter of Examples 9-11 includes, wherein: the circuitry comprises at least one processor, and the at least one processor is configured to determine an absolute concentration of the first gas based on the first light and second light emitted by the first emitter and second emitters at a first time and determine an absolute concentration of the second gas based on the first light and second light emitted by the first emitter and second emitters at a second time.

In Example 13, the subject matter of Examples 9-12 includes, wherein the circuitry comprises: controller circuitry that comprises at least one processor configured to provide control signals, emitter circuitry configured to drive the first emitter and second emitters based on the control signals, and detector circuitry configured to provide sensor signals that indicate an intensity of the first light and second light to the at least one processor.

In Example 14, the subject matter of Example 13 includes, wherein the emitter circuitry comprises: a first adjustable voltage regulator coupled with an anode of, and configured to drive, the first emitter and a second adjustable voltage regulator coupled with an anode of, and configured to drive, the second emitter, and a first transconductance device coupled with a cathode of the first emitter and controlled by a first control signal from the at least one processor and a second transconductance device coupled with a cathode of the second emitter and controlled by a second control signal from the at least one processor.

In Example 15, the subject matter of Examples 9-14 includes, wherein: the sensor comprises a single detector configured to detect the first light and the second light, and the circuitry comprises at least one processor configured to drive the first emitter and the second emitter at different times and to discriminate detected signals from the single detector based on timing of when the first light and the second light is detected at the detector to produce the detected signals.

Example 16 is a gas sensing system configured to measure a concentration of a first gas and a second gas in a gas sample introduced therein, each of the first gas and second gas having an absorption peak at a different wavelength, the gas sensing system comprising: a first emitter configured to emit first light having a spectrum that includes, a first wavelength of the different wavelengths of the first gas and second gas; a second emitter configured to emit second light having a spectrum that includes a second wavelength of the different wavelengths; a sensor configured to detect at least some of the first light and second light respectively emitted by the first emitter and second emitters; a cavity into which the first light and second light are absorbed by at least one of the first gas and the second gas, the cavity comprising a porous scattering material disposed within the cavity, the porous scattering material being substantially transparent to the first light and second light, the porous scattering material having regions that are configured to scatter at least some of the first light and second light; and at least one processor configured to determine concentration of the first gas and the second gas from signals from the sensor, the signals from the sensor indicating a first intensity of the first light and a second intensity of the second light.

In Example 17, the subject matter of Example 16 includes, wherein: the sensor comprises a single detector configured to detect the first light and the second light, and the at least one processor is configured to drive the first emitter and the second emitter at different times and to discriminate detected signals from the single detector based on timing of when the first light and the second light is detected at the detector to produce the detected signals.

In Example 18, the subject matter of Examples 16-17 includes, wherein the sensor comprises: a first detector configured to detect the first light; and a second detector configured to detect the second light.

Example 19 is a method for detecting gasses in a gas chamber, the method comprising: emitting first light having a first Medium Wavelength Infrared (MWIR) wavelength from a first emitter, a first gas of the gasses having an absorption peak at least near the first MWIR wavelength; emitting second light having a second MWIR wavelength from a second emitter, a second gas of the gasses having an absorption peak at least near the second MWIR wavelength; detecting at least some of the first light and second light that has been scattered by a porous scattering material disposed in a cavity containing the first gas and second gasses; and determining a concentration of the first gas and second gasses based on an intensity of the first light and second light detected.

In Example 20, the subject matter of Example 19 includes, wherein detecting the at least some of the first light and second light comprises controlling the first emitter and second emitters to emit the first light and second light at different times, detecting the at least some of the first light and second light using a single sensor, and discriminating between the first light and second light based on timing of the detection of the at least some of the first light and second light.

Example 21 is at least one machine-readable medium including instructions that, when executed by processing circuitry, cause the processing circuitry to perform operations to implement of any of Examples 1-20.

Example 22 is an apparatus comprising means to implement of any of Examples 1-20.

Example 23 is a system to implement of any of Examples 1-20.

Example 24 is a method to implement of any of Examples 1-20.

While exemplary embodiments of the present disclosed subject matter have been shown and described herein, it will be obvious to those skilled in the art that such embodiments are provided by way of example only. Numerous variations, changes, and substitutions will now occur to those skilled in the art, upon reading and understanding the material provided herein, without departing from the disclosed subject matter. It should be understood that various alternatives to the embodiments of the disclosed subject matter described herein may be employed in practicing the various embodiments of the subject matter. It is intended that the following claims define the scope of the disclosed subject matter and that methods and structures within the scope of these claims and their equivalents be covered thereby.

What is claimed is:

1. A gas sensing system configured to measure a concentration of a first gas and a second gas in a gas sample introduced therein, each of the first gas and second gas having an absorption peak at a different wavelength, the gas sensing system comprising:
    a first emitter configured to emit first light having a spectrum that includes a first wavelength of the different wavelengths of the first gas and second gas;
    a second emitter configured to emit second light having a spectrum that includes a second wavelength of the different wavelengths;
    a sensor configured to detect at least some of the first light and the second light respectively emitted by the first emitter and the second emitter; and
    a cavity into which the first light and the second light are to be at least partially absorbed by at least one of the first gas and the second gas, a porous solid material disposed in a location selected from a group of locations that include at least one location including in the cavity and in a wall surrounding the cavity, the porous material having hollow spaces large enough for the first gas and the second gas to permeate within the porous material, the porous material being at least substantially transparent at the wavelength at which each of the first gas and the second gas is absorbent.

2. The gas sensing system of claim 1, wherein the first emitter and the second emitter are disposed on a same side of the cavity.

3. The gas sensing system of claim 2, wherein the sensor is disposed on an opposite side of the cavity as the first emitter and the second emitter.

4. The gas sensing system of claim 3, wherein the sensor comprises:
    a first detector configured to detect the first light; and
    a second detector configured to detect the second light.

5. The gas sensing system of claim 2, wherein the sensor is disposed on the same side of the cavity as the first emitter and the second emitter.

6. The gas sensing system of claim 1, wherein walls of the cavity provide at least one type of reflection including specular reflection and diffusive reflection.

7. The gas sensing system of claim 1, further comprising an optical bandpass filter disposed between the first emitter, the second emitter, and the cavity, the optical bandpass filter being substantially transparent to the first wavelength and the second wavelength.

8. The gas sensing system of claim 1, further comprising:
    a printed circuit board (PCB) to which at least one emitter package containing the first emitter and the second emitter are attached; and
    circuitry configured to control the first emitter and the second emitter and the sensor that are disposed on the PCB.

9. The gas sensing system of claim 8, wherein the circuitry is disposed on an opposite side of the PCB as the at least one emitter package.

10. The gas sensing system of claim 9, wherein:
    the sensor is contained in at least one sensor package,
    the at least one sensor package is disposed on a same side of the cavity as the first emitter and the second emitter, and
    the at least one sensor package is attached to the PCB on a same side of the PCB as the at least one emitter package.

11. The gas sensing system of claim 8, wherein:
the circuitry comprises at least one processor, and
the at least one processor is configured to determine an absolute concentration of the first gas based on the first light and the second light emitted by the first emitter and the second emitter at a first time and determine an absolute concentration of the second gas based on the first light and the second light emitted by the first emitter and second emitters at a second time.

12. The gas sensing system of claim 8, wherein the circuitry comprises:
controller circuitry that comprises at least one processor configured to provide control signals,
emitter circuitry configured to drive the first emitter and the second emitter based on the control signals, and
detector circuitry configured to provide sensor signals that indicate an intensity of the first light and the second light to the at least one processor.

13. The gas sensing system of claim 12, wherein the emitter circuitry comprises:
a first adjustable voltage regulator coupled with an anode of, and configured to drive, the first emitter and a second adjustable voltage regulator coupled with an anode of, and configured to drive, the second emitter, and
a first transconductance device coupled with a cathode of the first emitter and controlled by a first control signal from the at least one processor and a second transconductance device coupled with a cathode of the second emitter and controlled by a second control signal from the at least one processor.

14. The gas sensing system of claim 8, wherein:
the sensor comprises a single detector configured to detect the first light and the second light, and
the circuitry comprises at least one processor configured to drive the first emitter and the second emitter at different times and to discriminate detected signals from the single detector based on timing of when the first light and the second light are detected at the detector to produce the detected signals.

15. The gas sensing system of claim 1, wherein the porous solid material is disposed in the wall surrounding the cavity.

16. A gas sensing system configured to measure a concentration of a first gas and a second gas in a gas sample introduced therein, each of the first gas and second gas having an absorption peak at a different wavelength, the gas sensing system comprising:
a first emitter configured to emit first light having a spectrum that includes a first wavelength of the different wavelengths of the first gas and second gas;
a second emitter configured to emit second light having a spectrum that includes a second wavelength of the different wavelengths;
a sensor configured to detect at least some of the first light and the second light respectively emitted by the first emitter and the second emitter;
a cavity into which the first light and the second light are absorbed by at least one of the first gas and the second gas, the cavity comprising a porous material disposed within the cavity, the porous material being substantially transparent to the first light and the second light, the porous material having regions that are configured to scatter at least some of the first light and the second light; and
at least one processor configured to determine concentration of the first gas and the second gas from signals from the sensor, the signals from the sensor indicating a first intensity of the first light and a second intensity of the second light.

17. The gas sensing system of claim 16, wherein:
the sensor comprises a single detector configured to detect the first light and the second light, and
the at least one processor is configured to drive the first emitter and the second emitter at different times and to discriminate detected signals from the single detector based on timing of when the first light and the second light is detected at the detector to produce the detected signals.

18. The gas sensing system of claim 16, wherein the sensor comprises:
a first detector configured to detect the first light; and
a second detector configured to detect the second light.

19. A method for detecting gasses in a gas chamber, the method comprising:
emitting first light having a first Medium Wavelength Infrared (MWIR) wavelength from a first emitter, a first gas of the gasses having an absorption peak at least near the first MWIR wavelength;
emitting second light having a second MWIR wavelength from a second emitter, a second gas of the gasses having an absorption peak at least near the second MWIR wavelength;
detecting at least some of the first light and the second light that has been scattered by a porous material disposed in a cavity containing the first gas and the second gas, the porous material having hollow spaces large enough for the first gas and the second gas to permeate within the porous material, the porous material being at least substantially transparent at the wavelength at which each of the first gas and the second gas is absorbent; and
determining a concentration of the first gas and the second gas based on an intensity of the first light and second light detected.

20. The method of claim 19, wherein detecting the at least some of the first light and second light comprises controlling the first emitter and the second emitter to emit the first light and the second light at different times, detecting the at least some of the first light and the second light using a single sensor, and discriminating between the first light and second light based on timing of the detection of the at least some of the first light and the second light.

* * * * *